(12) United States Patent
Iwase

(10) Patent No.: US 7,337,143 B2
(45) Date of Patent: Feb. 26, 2008

(54) METHOD FOR MANAGING PAYMENT AND PAYMENT MANAGING SYSTEM

(75) Inventor: Mikio Iwase, Tokyo (JP)

(73) Assignee: NEC Corporation, Tokyo (JP)

( * ) Notice: Subject to any disclaimer, the term of this patent is extended or adjusted under 35 U.S.C. 154(b) by 1079 days.

(21) Appl. No.: 09/826,905

(22) Filed: Apr. 6, 2001

(65) Prior Publication Data

US 2001/0029486 A1 Oct. 11, 2001

(30) Foreign Application Priority Data

Apr. 7, 2000 (JP) ............................ P2000-107048

(51) Int. Cl.
*G06Q 40/00* (2006.01)
(52) U.S. Cl. .......................................... 705/39; 705/40
(58) Field of Classification Search .................. 705/40, 705/43, 39, 41; 235/379–381
See application file for complete search history.

(56) References Cited

U.S. PATENT DOCUMENTS

| | | | | |
|---|---|---|---|---|
| 5,671,279 | A | * | 9/1997 | Elgamal ........................ 705/79 |
| 5,946,660 | A | * | 8/1999 | McCarty et al. ................ 705/5 |
| 6,304,860 | B1 | * | 10/2001 | Martin ......................... 705/43 |
| 6,311,170 | B1 | * | 10/2001 | Embrey ........................ 705/40 |

FOREIGN PATENT DOCUMENTS

| | | |
|---|---|---|
| JP | 3036165 | 1/1997 |
| JP | 9-218896 A | 8/1997 |
| JP | 10-240838 A | 9/1998 |
| JP | 11-53616 A | 2/1999 |
| JP | 11-120232 A | 4/1999 |
| JP | 11-259585 A | 9/1999 |
| JP | 2000-76338 A | 3/2000 |
| JP | 2000-113085 A | 4/2000 |

OTHER PUBLICATIONS

Lingnan University Digital Library, About the Library, "Answers to Suggestions", pp. 1-17, Sep. 14, 2000.*

* cited by examiner

*Primary Examiner*—Hani M. Kazimi
(74) *Attorney, Agent, or Firm*—Foley & Lardner LLP

(57) ABSTRACT

A method for managing a payment between a lessor and a lessee using a network. The method includes the steps of: inputting the name and identification data of the lessee into a lessee's terminal connected to the network; verifying the lessee based on the input name and identification data using a lessor's terminal; sending preregistered bank account information of the lessee to a bank server of the lessee using the lessee's terminal; sending preregistered bank account information of the lessor and a payment amount to the bank server of the lessee via the network using the lessor's terminal; and transferring the payment amount to the lessor's bank account, which is indicated by the preregistered bank account information of the lessor, from the lessee's bank account, which is indicated by the preregistered bank account information of the lessee, using the bank server of the lessee.

16 Claims, 3 Drawing Sheets

FIG. 2

| NAME | | |
|---|---|---|
| ID NUMBER | | |

~ 21
~ 22

| APARTMENT | RENT | NEXT DUE DATE | CONTRACT EXPIRY DATE |
|---|---|---|---|
| | | | |
| DATE OF PAYMENT | | | |

} 23
~ 24

| APARTMENT | RENT | NEXT DUE DATE | CONTRACT EXPIRY DATE |
|---|---|---|---|
| | | | |
| DATE OF PAYMENT | | | |

} 23
~ 24

⋮

| APARTMENT | RENT | NEXT DUE DATE | CONTRACT EXPIRY DATE |
|---|---|---|---|
| | | | |
| DATE OF PAYMENT | | | |

○○ PAYMENT MANAGING SYSTEM

INPUT YOUR NAME & ID

NAME

ID NUMBER

FIG. 3B

CHECK THE BOX TO WHICH PAYMENT IS MADE

☐ ×× APT.　　　# ××　　80000 YEN　～4/1/2001

☐ ×× PARK SPACE　# ××　20000 YEN　～3/25/2001

CANCEL

FIG. 3C

PAY THE AMOUNT INDICATED BELOW?

■ ×× APT.　　　# ××　　80000 YEN　～4/1/2001

■ ×× PARK SPACE　# ××　20000 YEN　～3/25/2001

TOTAL PAYMENT　100000 YEN　　OK　　CANCEL

METHOD FOR MANAGING PAYMENT AND PAYMENT MANAGING SYSTEM

BACKGROUND OF THE INVENTION

1. Field of the Invention

The present invention relates to a method for managing a payment and a payment managing system. More specifically, the present invention mainly relates to a method for managing a payment for an apartment or a parking lot, for instance, using a network, and a payment managing system using a network.

2. Description of Related Art

In general, there are conventionally four methods for making a payment for an apartment, a parking lot or other things (hereinafter simply referred to as an item), for instance, which require a payment (single, regular, periodic, etc.) as follows:

(1) a lessee (or buyer, etc.) brings cash directly to a lessor (or seller, etc.);

(2) a lessee makes a payment via a bank deposit transfer from lessee's bank account to lessor's bank account;

(3) a lessee makes a contract with a lessor via a bank to automatically transfer a certain amount of money from lessee's bank account to lessor's bank account; and (4) a lessee sends a check to a lessor by mail.

In a country such as Japan, the method described in (3) above is most popular for an item owned by a large real estate company, for instance. However, the methods described in (1) and (2) above are also common for a payment for a relatively small item owned by a small company or an individual.

In the method described in (2) above, a lessee needs to go to a bank and carry out transactions using a terminal device provided by the bank to make a payment via a bank deposit transfer. In the same manner, a lessor needs to go to a bank and confirm the payment from the lessee using a terminal device provided by the bank. The payment from the lessee may be recorded in a passbook savings account. Also, if the payment is not made by the due date, the lessor needs to send a reminder to the lessee or call the lessee to request the payment. Moreover, when the expiry date of the terms of the contract approaches, the lessor needs to confirm the lessee's intention to renew the contract by using such means as the telephone.

In the above mentioned conventional method, however, the lessee must spend his/her valuable time to go to the bank or to the lessor's location to make a payment. Likewise, the lessor needs to spend his/her valuable time to go to the bank to confirm the payment or, in the method described in (4) above, the lessor is required to go to the bank to cash or deposit the received check. Also, procedures for sending reminders to the lessee or confirming the renewal of the contract are troublesome and a large burden for the lessor.

Accordingly, an object of the present invention is to provide a method and a system for managing a payment in which it is possible to make a payment or confirm a payment without the necessity for a lessor or a lessee to go to a bank.

Another object of the present invention is to provide a method and a system for managing a payment in which a lessor does not need to send a reminder or a confirmation to a lessee to request an overdue payment or to confirm the lessee's intention to renew a contract.

SUMMARY OF THE INVENTION

The present invention provides a method for managing a payment between an entity A and an entity B using a network, including the steps of: inputting the name and identification data of entity B into entity B's terminal connected to the network; verifying entity B based on the input name and identification data using entity A's terminal connected to the network; sending preregistered bank account information of entity B, after entity A's terminal has verified entity B, to a bank server of entity B via the network using entity B's terminal; sending preregistered bank account information of entity A and a payment amount, after entity A's terminal has verified entity B, to the bank server of entity B via the network using entity A's terminal; and transferring the payment amount to entity A's bank account, which is indicated by the preregistered bank account information of entity A, from entity B's bank account, which is indicated by the preregistered bank account information of entity B, using the bank server of entity B.

In accordance with another aspect of the invention, the bank account information of entity B is sent and received after being encoded.

In yet another aspect of the invention, entity A's terminal is installed with a payment managing table to store payment status information, and the entity A's terminal renews the payment status information when the payment amount is transferred to entity A's bank account from entity B's bank account.

In yet another aspect of the invention, the payment managing table is capable of storing data of a plurality of entities B.

In yet another aspect of the invention, a method for managing a payment further comprises the step of: sending entity B's terminal a reminder to request a payment for an overdue item by using entity A's terminal.

In yet another aspect of the invention, a method for managing a payment further comprises the step of: sending entity B's terminal a confirmation to renew a payment contract if there is less than a predetermined period remaining until the expiry date of the contract by using entity A's terminal.

In yet another aspect of the invention, entity A is a lessor and entity B is a lessee.

In yet another aspect of the invention, the payment amount is a rent.

The present invention also provides a payment managing system between an entity A and an entity B using a network, including: a terminal device of entity B into which the name and identification data of entity B is input; a terminal device of entity A which verifies entity B based on the input name and identification data of entity B, the terminal device of entity A being connected to the terminal device of entity B via the network; a bank server of entity B which receives preregistered bank account information of entity B from the terminal device of entity B after the terminal device of entity A has verified entity B, the bank sever of entity B being connected to the terminal device of entity B via the network; and a bank server of entity A which receives preregistered bank account information of entity A and a payment amount from the terminal device of entity A after the terminal device of entity A has verified entity B, the bank server of entity A being connected to the terminal device of entity A via the network, wherein the bank server of entity B transfers the payment amount to the bank account of entity A, which is indicated by the preregistered bank account information of entity A, from the bank account of entity B, which is indicated by the preregistered bank account information of entity B.

In accordance with another aspect of the invention, the terminal device of entity B encodes the bank account information of entity B.

In yet another aspect of the invention, the terminal of the entity A is installed with a payment managing table which stores payment status information, the terminal of the entity A renewing the payment status information when the payment amount is transferred to the bank account of entity A from the bank account of entity B.

In yet another aspect of the invention, the payment managing table is capable of storing data of a plurality of entities B.

In yet another aspect of the invention, the terminal device of entity A sends the terminal device of entity B a reminder to request a payment for an overdue item.

In yet another aspect of the invention, the terminal device of entity A sends the terminal device of entity B a confirmation to renew a payment contract if there is less than a predetermined period remaining until the expiry date of the contract.

In yet another aspect of the invention, entity A is a lessor and entity B is a lessee in the above-mentioned system.

In yet another aspect of the invention, the payment amount is a rent in the above-mentioned system.

BRIEF DESCRIPTION OF THE DRAWINGS

Some of the features and advantages of the invention have been described, and others will become apparent from the detailed description which follows and from the accompanying drawings, in which:

FIG. 2 is a diagram for explaining an example of the display of a payment managing table used in the embodiment of the present invention;

FIG. 3A is a diagram for explaining an example of the display of a homepage screen used in the embodiment of the present invention;

FIG. 3B is a diagram for explaining an example of the display of a homepage screen used in the embodiment of the present invention; and FIG. 3C is a diagram for explaining an example of the display of a homepage screen used in the embodiment of the present invention.

DETAILED DESCRIPTION OF THE INVENTION

Figure 1:
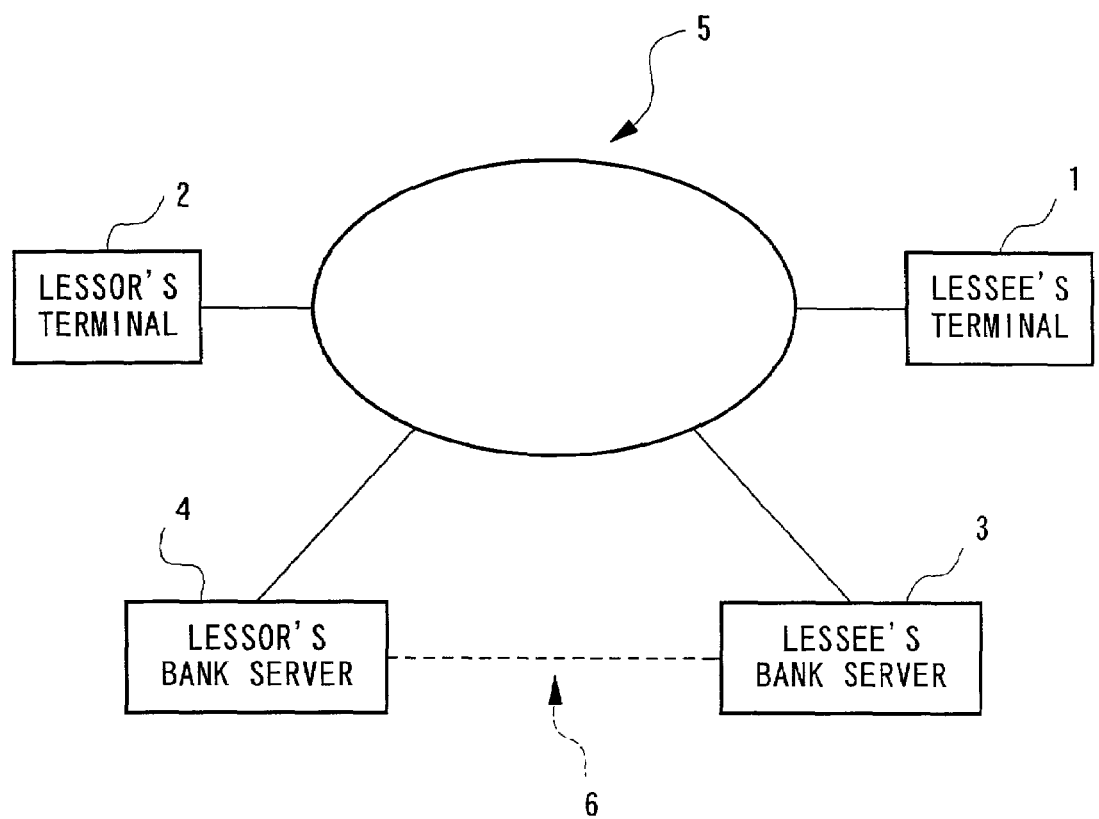
FIG. 1 is a block diagram showing a payment managing system according to an embodiment of the present invention.

The invention summarized above and defined by the enumerated claims may be better understood by referring to the following detailed description, which should be read with reference to the accompanying diagrams. This detailed description of a particular preferred embodiment, set out below to enable one to build and use one particular implementation of the invention, is not intended to limit the enumerated claims, but to serve as a particular example thereof. Note that in the following embodiments, only a lessor—lessee relationship is explained as an example; the present invention is not limited to such a relationship and may be applied to any entity A—entity B relationships, such as a seller—buyer relationship, a tenant—landlord relationship, or any other relationships in which some sort of payment from one party to the other party is involved.

FIG. 1 is a block diagram showing a payment managing system according to an embodiment of the present invention. In FIG. 1, a lessee's terminal 1 is a terminal owned by a lessee. More specifically, the lessee's terminal 1 may be a computer unit including a CPU (i.e., a central processing unit) and peripheral circuits thereof.

A lessee's bank account information is registered in advance in the lessee's terminal 1. The lessee's bank account information includes the name of a bank providing the lessee's bank account, the branch name of the bank, the lessee's account number, and his/her personal identification number (PIN).

A lessor's terminal 2 shown in FIG. 1 is a terminal owned by a lessor. The lessor's terminal 2 is a computer unit including a CPU and peripheral circuits thereof.

A lessor's bank account information is registered in advance in the lessor's terminal 2. The lessor's bank account information includes the name of a bank providing the lessor's bank account, the branch name of the bank, and the lessor's account number.

Also, in the lessor's terminal 2, a payment managing table for every lessee is installed. FIG. 2 is a diagram showing an example of the display of the payment managing table. As shown in FIG. 2, the payment managing table stores a name of the lessee 21, an identification number 22, contract information 23, and payment status information 24. Note that the identification number 22 may be replaced by other identifiers for verifying the lessee (for instance, a password). The contract information 23 may include the name of an item (real estate, goods, etc.,), a monetary amount (i.e., rent, payment, etc.), the next payment due date, and the expiry date of the contract. The payment status information 24 is a history of payments by the lessee to date. Also, if a contract is made between a lessor and a plurality of lessees, a plurality of contract information 23 and payment status information 24 for each lessee may be stored in the payment managing table as shown in FIG. 2.

Referring back to FIG. 1, a lessee's bank server 3 is a server owned by a bank at which the lessee has his/her bank account. More specifically, the lessee's bank server 3 may be a computer unit including a CPU and peripheral circuits thereof. The lessee's bank server 3 carries out well-known general deposit/withdrawal transactions for the lessee's bank account.

Also, a lessor's bank server 4 is a server owned by a bank at which the lessor has his/her bank account. The lessor's bank server 4 may be a computer unit including a CPU and peripheral circuits thereof. The lessor's bank server 4 carries out well-known general deposit/withdrawal transactions for the lessor's bank account.

The lessee's terminal 1, the lessor's terminal 2, the lessee's bank server 3, and the lessor's bank server 4 are connected to each other via a predetermined network 5 (for instance, the Internet in this embodiment). The lessee's bank server 3 and the lessor's bank server 4 are also connected to each other via a leased line 6 specially designed for transactions between the bank accounts.

Next, a method for making a payment via a bank deposit transfer using a payment managing system according to an embodiment of the present invention will be described in detail.

First, a lessor opens his/her homepage via the Internet 5 (i.e., a network) in advance.

Second, a lessee who wishes to make a payment accesses the lessor's homepage.

When the lessee accesses the homepage, the lessor's terminal 2 shows the lessor's name, the title "payment managing system", instructions such as "please input your name and PIN", and a space for inputting the lessee's name and PIN.

An example of the homepage design is shown in FIG. 3A. The usage of the payment system or advertisements for other vacant housing may also be displayed in addition to the content shown in FIG. 3A.

Then, the lessee inputs his/her name and PIN in the space provided. The lessor's terminal 2 verifies that the person accessing to the homepage is actually the lessee by successively comparing the input name and PIN with the name 21 and the PIN 22 stored in the payment managing table (refer to FIG. 2).

If the person accessing the homepage is confirmed to be the lessee, the lessor's terminal 2 reads the contract information 23 corresponding to the input name and PIN from the payment managing table.

After that, the lessor's terminal 2 displays the lessee's name and instructions, for instance, "please check the item to which this payment is to be made for this time", the title of items (e.g., name of apartments, etc.), the amount billed (e.g., rent, etc.), due date, check boxes, and a software switch for "Cancel".

An example of the homepage design is shown in FIG. 3B. If the lessee clicks "Cancel", the homepage screen returns to the start screen as shown in FIG. 3A. Note that if a plurality of contracts have been made between the lessor and the lessee, the lessor's terminal 2 displays the title, the amount billed, the due date and a check box for each one of the items to which the contract was made.

Then, the lessee puts a check mark in the check box of the items to which a payment is to be made for this time.

The lessor's terminal 2 calculates the total amount to be paid by adding the amount of each item to be billed which is indicated by a check mark. Then, the lessor's terminal 2 displays the name of the lessee and instructions, for instance, "Would you like to make a payment of the total as shown below?", the total amount to be paid, and software switches for "OK" and "Cancel".

An example of the homepage design is shown in FIG. 3C. If the lessee clicks "Cancel", the homepage screen returns to the screen shown in FIG. 3B.

After confirming the total amount to be paid, the lessee clicks "OK". If the lessee clicks "OK", then the lessee's terminal 1 encodes the lessee's bank account information, which has been stored in the lessee's terminal 1, and sends the lessee's encoded bank account information to the lessee's bank server 3.

According to the system of the present invention, therefore, the PIN for the lessee's bank account is not learned by the lessor since the lessee's bank account information is encoded by the lessee's terminal 1.

Also, if the lessee clicks "OK", the lessor's terminal 2 encodes the lessor's bank account information, which has been stored in the lessor's terminal 2, and sends the lessor's encoded bank account information and the calculated total payment amount to the lessee's bank server 3. Note that although the lessor's bank account information is also encoded in this embodiment, the lessor's bank account information may be sent without being encoded since it does not contain the PIN for the lessor's bank account.

Then, the lessee's bank server 3 decodes the received lessee's bank account information and the lessor's bank account information. After that, the lessee's bank server 3 transfers the total payment amount to the lessor's bank account, which is indicated by the lessor's decoded bank account information, from the lessee's bank account, which is indicated by the lessee's decoded bank account information, via the leased line 6.

Then, the lessor's bank server 4 sends acknowledgement of the total payment received to the lessor's terminal 2. If the acknowledged total payment amount is equal to the previously calculated total amount to be paid, the lessor's terminal 2 renews the due date section in the payment managing table (refer to FIG. 2) to show the next payment due date of the checked item, and displays the date the acknowledgement was received in the corresponding section of the payment status information 24.

After that, the lessor's terminal 2 sends an acknowledgement to the lessee's terminal 1 that the payment was completed.

Upon receiving the acknowledgement, the lessee's terminal 1 displays the completion of payment on the screen, and this terminates the series of procedures required for a method for making a payment via a bank deposit transfer using a payment managing system according to an embodiment of the present invention.

Furthermore, in addition to the above-mentioned payment procedures, the lessor's terminal 2 may carry out an additional operation to send a reminder to the lessee's terminal 1 to request the payment if there is an overdue item determined by comparing (once a day, for instance) the due date stored in the payment managing table with the date the comparison is made.

Also, in addition to the above-mentioned payment procedures, the lessor's terminal 2 may carry out an additional operation to send a renewal confirmation to the lessee's terminal 1 to confirm the intent of the lessee to renew the contract if there is less than a predetermined period remaining between the expiry date of the contract and the date the comparison is made. Such determination may be made by comparing (once a day, for instance) the expiry date of the contract stored in the payment managing table with the date the comparison is made.

Having thus described exemplary embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

The invention claimed is:

1. A method for managing a payment between a seller and a buyer using a network, comprising:
   at a buyer terminal, accessing a home page of said seller through said network;
   inputting at the home page of said seller displayed on said buyer terminal, a name and identification data of said buyer into said buyer terminal connected to said network, said identification data including a password of said buyer;
   verifying said buyer based on the input name and identification data using a seller terminal connected to said network, said verifying including comparing said password of said buyer entered at said buyer terminal with password data stored in a payment management table installed at said seller terminal;
   displaying at said buyer terminal, for each contract of one or more contracts between said buyer and said seller, a title, an amount due, and a due date, said buyer authorizing at said buyer terminal payment as to each contract;

sending bank account information of said buyer, after said seller terminal has verified said buyer, directly to a bank server of said buyer via said network using said buyer terminal, said bank account information of said buyer including an encoded PIN number of said buyer;

sending bank account information of said seller and a payment amount, after said seller terminal has verified said buyer, directly to said bank server of said buyer via said network using said seller terminal; and transferring the payment amount to a bank account of said seller, which is indicated by said bank account information of said seller, directly from a bank account of said buyer, which is indicated by said bank account information of said buyer, using said bank server of said buyer, said transfer taking place over a line separate from said network.

2. The method for managing a payment according to claim 1, wherein said seller terminal updates said payment management table to reflect a current payment status when the payment amount is transferred to said bank account of said seller from said bank account of said buyer.

3. The method for managing a payment according to claim 2, wherein the payment management table is capable of storing data related to a plurality of buyers.

4. The method for managing a payment according to claim 1, further comprising:
sending said buyer terminal a reminder to request a payment for an overdue item by using said seller terminal.

5. The method for managing a payment according to claim 1, further comprising:
sending said buyer terminal a confirmation to renew a payment contract if there is less than a predetermined period of time remaining until an expiry date of the payment contract, by using said seller terminal.

6. The method for managing a payment according to claim 1, wherein said seller is a lessor and said buyer is a lessee.

7. The method for managing a payment according to claim 6 wherein the payment amount is a rent.

8. The method for managing a payment according to claim 1, wherein said bank account information of said buyer is not sent to said seller terminal.

9. A payment managing system between a seller and a buyer using a network, comprising:
a buyer terminal device for accessing a home page of said seller and for displaying said home page to permit entry at said buyer terminal device of a name and identification data of said buyer;
a seller terminal device for verifying said buyer based on the input name and identification data of said buyer, said seller terminal device connected to said buyer terminal device via said network, said seller terminal device configured to verify said buyer by comparing said identification data of said buyer entered at said buyer terminal device with identification data stored in a payment management table at said seller terminal device;
said buyer terminal device configured to display, for each contract of one or more contracts between said buyer and said seller, a title, an amount due, and a due date, said buyer terminal device configured to allow said buyer to authorize payment as to each contract;
a bank server of said buyer for receiving bank account information of said buyer directly from said buyer terminal device after said seller terminal device has verified said buyer, said bank sever of said buyer connected to said buyer terminal device via said network, said bank account information of said buyer including a PIN number which is encoded prior to sending to said bank server of said buyer from said buyer terminal device; and
a bank server of said seller;
wherein said bank server of said buyer is configured to receive bank account information of said seller and a payment amount directly from said seller terminal device after said seller terminal device has verified said buyer; and
wherein said bank server of said buyer is configured to directly transfer the payment amount to a bank account of said seller, which is indicated by said bank account information of said seller, from a bank account of said buyer, which is indicated by said bank account information of said buyer, said transfer taking place over a dedicated line between said bank server of said buyer and said bank server of said seller that is separate from said network.

10. The payment managing system according to claim 9, wherein said buyer terminal device is configured to encode said bank account information of said buyer.

11. The payment managing system according to claim 9, wherein said payment management table stores payment status information, said seller terminal device configured to renew the payment status information when the payment amount is transferred to said bank account of said seller from said bank account of said buyer.

12. The payment managing system according to claim 11, wherein the payment management table is capable of storing data related to a plurality of buyers.

13. The payment managing system according to claim 9, wherein said seller terminal device is configured to send said buyer terminal device a reminder to request a payment for an overdue item.

14. The payment managing system according to claim 9, wherein said seller terminal device is configured to send said buyer terminal device a confirmation to renew a payment contract if there is less than a predetermined period of time remaining until an expiry date of the payment contract.

15. The payment managing system according to claim 9, wherein said seller is a lessor and said buyer is a lessee.

16. The payment managing system according to claim 15, wherein the payment amount is a rent.

* * * * *